(12) United States Patent (10) Patent No.: US 8,213,719 B2
Vukosavljevic et al. (45) Date of Patent: Jul. 3, 2012

(54) EDITING 2D STRUCTURES USING NATURAL INPUT

(75) Inventors: Milan Vukosavljevic, Belgrade (RS); Bodin Dresevic, Belgrade (RS); Nikola Letic, Belgrade (RS); Goran Predovic, Belgrade (RS)

(73) Assignee: Microsoft Corporation, Redmond, WA (US)

(*) Notice: Subject to any disclaimer, the term of this patent is extended or adjusted under 35 U.S.C. 154(b) by 952 days.

(21) Appl. No.: 12/236,596

(22) Filed: Sep. 24, 2008

(65) Prior Publication Data

US 2010/0074527 A1    Mar. 25, 2010

(51) Int. Cl.
 *G06K 9/36* (2006.01)
(52) U.S. Cl. .......................... 382/186; 382/187; 715/267
(58) Field of Classification Search .................. None
 See application file for complete search history.

(56) References Cited

U.S. PATENT DOCUMENTS

| | | | | |
|---|---|---|---|---|
| 5,235,292 A * | 8/1993 | Endo et al. | ................. | 331/49 |
| 5,666,139 A * | 9/1997 | Thielens et al. | ............. | 345/173 |
| 6,502,114 B1 | 12/2002 | Forcier | | |
| 7,259,752 B1 | 8/2007 | Simmons | | |
| 7,262,785 B2 | 8/2007 | Silverman et al. | | |
| 7,292,727 B2 | 11/2007 | Geidl et al. | | |
| 7,322,008 B2 | 1/2008 | Thacker | | |
| 7,392,475 B1 * | 6/2008 | Leban et al. | ................. | 715/255 |
| 7,394,935 B2 | 7/2008 | Chen et al. | | |
| 7,574,048 B2 * | 8/2009 | Shilman et al. | ............... | 382/187 |
| 2002/0149630 A1 * | 10/2002 | Kitainik et al. | ............... | 345/863 |
| 2003/0215142 A1 | 11/2003 | Gounares et al. | | |
| 2004/0054701 A1 * | 3/2004 | Garst | ............................ | 708/131 |
| 2006/0059214 A1 | 3/2006 | Sargent, III et al. | | |
| 2007/0097102 A1 * | 5/2007 | Keely et al. | .................. | 345/179 |
| 2008/0253657 A1 * | 10/2008 | Radakovic et al. | ........... | 382/182 |

FOREIGN PATENT DOCUMENTS

KR    20050061620 A    6/2005

OTHER PUBLICATIONS

Labahn, George, et al. "MathBrush: An Experimental Pen-Based Math System", Dagstuhl Seminar Proceedings, Challenges in Symbolic Computation Software, Oct. 2006, Germany.

Smirnova, Elena, et al., "A pen-based mathematical environment Mathink", Ontario Research Center for Computer Algebra, The University of Western Ontario, London, ON, Canada, Nov. 30, 2006.

(Continued)

*Primary Examiner* — Brian P Werner
(74) *Attorney, Agent, or Firm* — Boswell IP Law; J. Mason Boswell

(57) ABSTRACT

A natural input system is described for creating and editing complex structures in a typeset application. The natural input system receives a typeset representation of an object and converts the typeset format to generate a standard digital ink representation. The natural input system provides the generated ink representation to a natural input application where can be manipulated by the user with a rich set of correction and editing features provided by the natural input application. Once the end user is satisfied with the recognition result in the natural input application, the natural input system receives the recognition result based on the modified digital ink representation. The natural input system may convert the received recognition result to the typeset application format and provides the modified typeset representation to the typeset application for merging into the document the user is editing.

20 Claims, 6 Drawing Sheets

OTHER PUBLICATIONS

Arvo, et al, "Equation Entry and Editing via Handwriting and Gesture Recognition", Retrieved at <<http://www.cs.auckland.ac.nz/~novins/Publications/Smithies01.pdf>>, Jan. 2001, pp. 1-23.

Conroy, et al., "ProofRite: A Paper-Augmented Word Processor", Retrieved at <<http://hcil.cs.umd.edu/trs/2004-22/2004-22.html>>, Jul. 17, 2008, pp. 1-11.

Yao, Paul "Add Support for Digital Ink to Your Windows Applications", Retrieved at <<http://msdn.microsoft.com/en-us/magazine/cc163869.aspx>>, Jul. 17, 2008, pp. 1-12.

Zanibbi, et al., "Aiding Manipulation of Handwritten Mathematical Expressions through Style-Preserving Morphs", Retrieved at <<http://citeseer.ist.psu.edu/cache/papers/cs/22591/http:zSzzSzwww.cs.caltech.eduzSz~arvozSzpaperszSzGI-2001.pdf/zanibbi01aiding.pdf>>, pp. 8.

Rooney, Paula, et al., "Lonestar, Longhorn Editions of Tablet OS to Advance Ink, Handwriting", Retrieved at<<http://www.crn.com/it-channel/18840092>>, Oct. 28, 2003, pp. 1-7.

\* cited by examiner

EDITING 2D STRUCTURES USING NATURAL INPUT

BACKGROUND

Documents often contain various types of elements, including one- and two-dimensional (2D) structures. A one-dimensional structure is an organization of elements whose location can be described with only one axis (i.e., a line). For example, text is an example of a typical one-dimensional (linear) structure. A two-dimensional structure has elements organized in terms of a flat surface whose location is described with two orthogonal axes. Examples of two-dimensional structures are mathematical expressions, chemical expressions, music notations, and so forth. Creating and editing 2D structures is commonly performed using a keyboard and/or mouse to select from drop-down menus. For example, a drop-down menu may contain symbols used in the 2D structure, such as mathematical symbols. Following is an example of a 2D mathematical structure:

$$x = \frac{-b \pm \sqrt{b^2 - 4ac}}{2a}$$

Creating and editing 2D structures using the keyboard often involves a steep learning curve. Usually, a user learns a specialized language that can describe structure from a particular domain. For example, TeX is a language for describing mathematical expressions using keyboard input. Note that in this scenario there is no easy way to switch between 2D domains. If an end user wants to write chemical expressions as well as mathematical expressions, he/she has to learn at least two languages. Drop-down menus can be used in conjunction with keyboard input to reduce the amount of learning, but input in this way is still a slow and tedious process.

Varieties of products that offer such combined experiences exist on the market today. For example, Microsoft Word 2007 has a proprietary language for keyboard input of 2D structures, as well as drop-down menu support for less advanced users. Nevertheless, most of these applications are capable of offering a good user experience for editing 2D structures only in very limited scenarios, such as when linear parts (one-dimensional) of the structure are being changed. As soon as the user wants to change a non-linear expression, or part of an expression, the process becomes very tedious. For more complicated editing operations, whole parts of a typeset 2D structure often have to be erased and typed in from scratch to achieve the desired result.

A tablet PC, or pen computer, is a notebook or slate-shaped mobile computer, equipped with a touch screen or graphics tablet/screen hybrid technology that allows the user to operate the computer with a stylus, digital pen, or fingertip instead of a keyboard or mouse. Tablet PCs offer a more natural form of input, as sketching and handwriting are a much more familiar form of input than a keyboard and mouse, especially for people who are new to computers. Tablet PCs can also be more accessible because those who are physically unable to type can utilize the additional features of a tablet PC to be able to interact with the electronic world.

Natural input applications are available that recognize and store user handwriting on a tablet PC. Natural input applications often store non-text user input as images without any information about the purpose or structure of the image. Thus, this type of input is typically no more useful for editing typeset 2D structures, such as for word processors. The application may also store the user input as a series of ink strokes or as an array of points. Domain-specific natural input applications that support handwriting input for a specified 2D domain (e.g., are equipped with handwriting recognizer for that domain) usually have a very rich correction experience and can therefore provide much more time efficient editing experience, but are often proprietary and not usable with typeset applications or multiple domains.

SUMMARY

A natural input system is described for creating and editing complex structures, such as 2D structures, in a typeset application, such as a document editing application. The natural input system bridges the gap between typeset applications and domain-specific natural input applications to allow including 2D structures in documents in a generic way that allows editing of the 2D structures using natural input methods, such as handwriting. A user selects an object stored in a typeset format and indicates to the natural input system that the user wants to edit the object with a natural input method. The natural input system receives the typeset representation of the object and converts the typeset format to generate a standard digital ink representation that looks similar to its typeset original. The natural input system provides the generated ink representation to a natural input application where it is recognized by the natural input recognizer for a specific 2D domain and can be manipulated by the user with a rich set of correction and editing features provided by the natural input application. Once the end user is satisfied with the recognition result in the natural input application, the natural input system receives a recognition result based on the modified digital ink representation. The natural input system may convert the received recognition result to the typeset application format (if not converted already) and provides the modified typeset representation to the typeset application for merging into the document the user is editing. Thus, the natural input system provides an end-to-end solution that significantly improves an end user's experience in terms of ease of use and time spent to edit typeset 2D structures.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
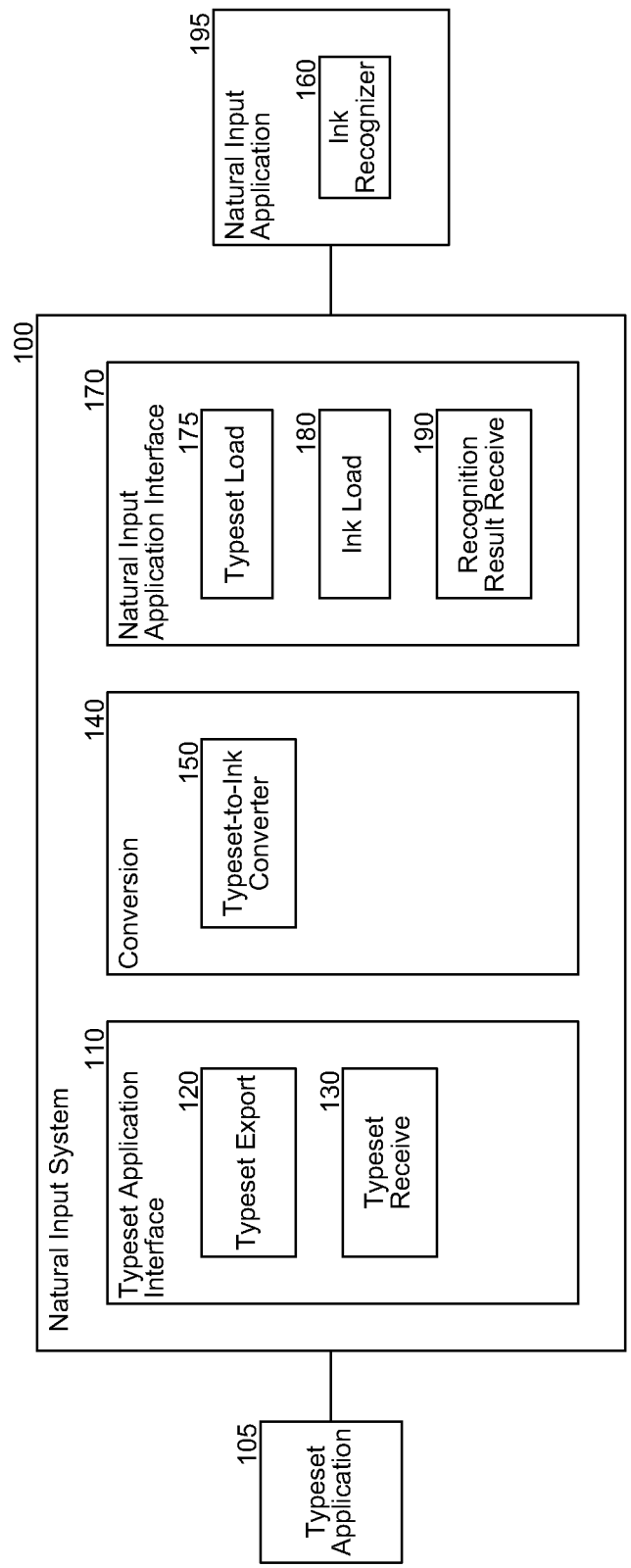
FIG. 1 is a block diagram that illustrates components of the natural input system, in one embodiment.

A natural input system is described for creating and editing complex structures, such as 2D structures, in a typeset application, such as a document editing application. The natural input system bridges the gap between typeset applications and domain-specific natural input applications to allow including 2D structures in documents in a generic way that allows editing of the 2D structures using natural input methods, such as handwriting. Typeset applications typically can export typeset 2D structures in one or more internal typeset formats. For example, Microsoft Word 2007 can export math equations in the Extensible Markup Language (XML)-based Math Markup Language (MathML). MathML is a special flavor of XML defined by an international standards body and adapted for describing the structure and content of mathematical notation. A user selects an object stored in a typeset format and indicates to the natural input system that the user wants to edit the object with a natural input method. For example, the user may select a math equation in a word processing application.

The natural input system receives the typeset representation of the object. For example, the system may receive MathML describing the selected equation. The natural input system converts the typeset format to generate a standard digital ink representation that looks similar to its typeset original, as described further herein. For example, the system may convert MathML to a standard digital ink format. Digital ink is a data type representing pen strokes, including metadata about the strokes, and contextual awareness of where the ink is used in an application. The natural input system provides the generated ink representation to a natural input application where it is recognized by the natural input recognizer for a specific 2D domain and can be manipulated by the user with a rich set of correction and editing features provided by the natural input application. The recognizer may know the final result in the first recognition (but not the stroke assignments). For example, the system may provide converted MathML to a math equation natural input application that provides rich capabilities for editing math equations with natural input. Performing modifications on ink inside the natural input application is typically faster for the user than conventional methods (like a keyboard or drop down menus) and is much more natural, without the steep learning curve.

Once the end user is satisfied with the recognition result in the natural input application, the natural input system receives a recognition result based on the modified digital ink representation. For example, the system may receive an object model of a recognized math equation that includes an additional variable over the original digital ink representation. The natural input system may convert the received recognition result to the typeset application format and provides the modified typeset representation to the typeset application for merging into the document the user is editing. For example, the system may convert the recognition result back into MathML and provide the MathML to Microsoft Word. Thus, the natural input system provides an end-to-end solution that significantly improves an end user's experience in terms of ease of use and time spent to edit typeset 2D structures.

FIG. 1 is a block diagram that illustrates components of the natural input system, in one embodiment. The natural input system 100 includes a typeset application interface 110, a conversion component 140, and a natural input interface 170. Each of these components is described in further detail herein. The natural input system 100 interfaces with a typeset application 105 and a natural input application 195. Although the term application is used herein, those of ordinary skill in the art will recognize that either or both of the typeset application 105 and the natural input application 195 may be standalone applications or controls hosted within other applications. For example, the typeset application 105 and natural input application 195 may be controls hosted within a web browser, the typeset application 105 may be a standalone application and the natural input application 195 may be a control loaded by the typeset application 105, and so forth.

The typeset application interface 110 includes a typeset export component 120 and a typeset merge component 130. The typeset application interface 110 provides the interface between the system 100 and the typeset application 105 for extracting and updating 2D structures managed by the typeset application 105.

The typeset export component 120 exports 2D structures from typeset applications so that the system can provide them to natural input applications for editing using digital ink. The typeset export component 120 may be a part of the typeset application or integrated with the system 100. The system may access typeset structures using an application programming interface (API) provided by the typeset application. For example, spreadsheet application may provide an object model for programmatically accessing contents of a spreadsheet document, including 2D structures.

The typeset merge component 130 receives modified 2D structures from the system 100 after a user using a natural input method as described further herein has edited them. For example, the user may edit digital ink using a natural input application. The system provides a typeset representation of the digital ink to the typeset application. The typeset application merges the typeset representation with the document, such as by replacing the previous representation of the 2D structure stored with the document. As previously noted, the system 100 may interact with the application using an API provided by the application. For example, a word processing application may provide an API for selecting and updating 2D structures and other document content.

The conversion component 140 includes a typeset-to-ink converter component 150 and an ink recognizer component 160. The conversion component 140 is responsible for converting typeset representations to digital ink and digital ink representations to typeset.

The typeset-to-ink converter component 150 receives typeset representations from the typeset application 105 via the typeset application interface 110 and converts the typeset representations to digital ink representations. The typeset to ink converter typically divides the received typeset into one or more symbols or characters, and identifies an ink equivalent for each individual symbol or character. For example, if a music notation contains the note "C" the component 150 may identify an ink-based letter "C" stored in a resource file or other location. The component 150 combines information about the identified ink equivalents in an ink representation structure that contains information about the layout and size of each ink element similar to the original size and layout of the original typeset representation. This process is described further herein. In some embodiments, the typeset-to-ink converter component 150 may be omitted or included in the natural input application 195. For example, the natural input application 195 may be capable of receiving some typeset representations directly, such as MathML or other common standards.

The ink recognizer component 160 recognizes handwriting or other natural input entered by a user and converts the natural input to a typeset structure. The component 160 may take an approach similar but opposite to that of the typeset-to-ink converter component 150. For example, the component 160 may identify individual elements within the natural input (e.g., letters, numbers, and so on), and match each individual element to a similar typeset equivalent. Ink recognition software is readily available and the ink recognizer component 160 may be built into the natural input application 195 (as shown) or provided as a third-party component called by the conversion component 140 to request conversion. In the end, the conversion component 140 receives a typeset representation of the 2D structure as modified by the user.

The natural input application interface 170 includes a typeset load component 175, an ink load component 180, and a recognition result receive component 190. The natural input application interface 170 provides the interface between the system 100 and the natural input application 195 for loading ink representing existing 2D structures and receiving modified ink containing user modifications to 2D structures.

The typeset load component 175 is used in cases where the natural input application 195 is capable of receiving typeset directly. In such cases, the typeset-to-ink converter component 150 may also be included in the natural input application 195, such that the natural input application 195 receives typeset and converts it to ink. This can be beneficial for several reasons. For example, this type of configuration allows the natural input application 195 to receive drag-and-drop or clipboard-based MathML or other supported 2D structure formats directly from the typeset application 105.

The ink load component 180 loads digital ink based on a converted typeset representation of a 2D structure into the natural input application 195 for editing by the user. For example, the natural input application 195 may provide an API for providing input to the application 195. Alternatively or additionally, the natural input system 100 may store digital ink in a file or other storage location and pass information about the storage location to the natural input application 195 on the command line or through other forms of inter-application communication. The natural input system 100 may also use the Text Framework Service (TFS), the operating system clipboard, drag-and-drop, or other communication methods. The ink load component 180 may provide digital ink in a standardized format that can be read by multiple applications. Thus, in some cases the user may have multiple natural input applications to choose from based on the user's preferences and available forms of natural input (e.g., hardware peripherals installed).

The recognition result receive component 190 receives edited recognition results from the ink recognizer 160 or other converted natural input from the natural input application 195. For example, a user may erase a variable, add more elements to an equation, and so forth using handwriting, and then the natural input application 195 provides this input to the system 100. In some embodiments, the natural input application 195 includes the ink recognizer component 160 or other recognizer for converting digital ink into a typeset structure or another standardized format that the system 100 can convert into a desired format for providing to the typeset application 105.

The computing device on which the system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
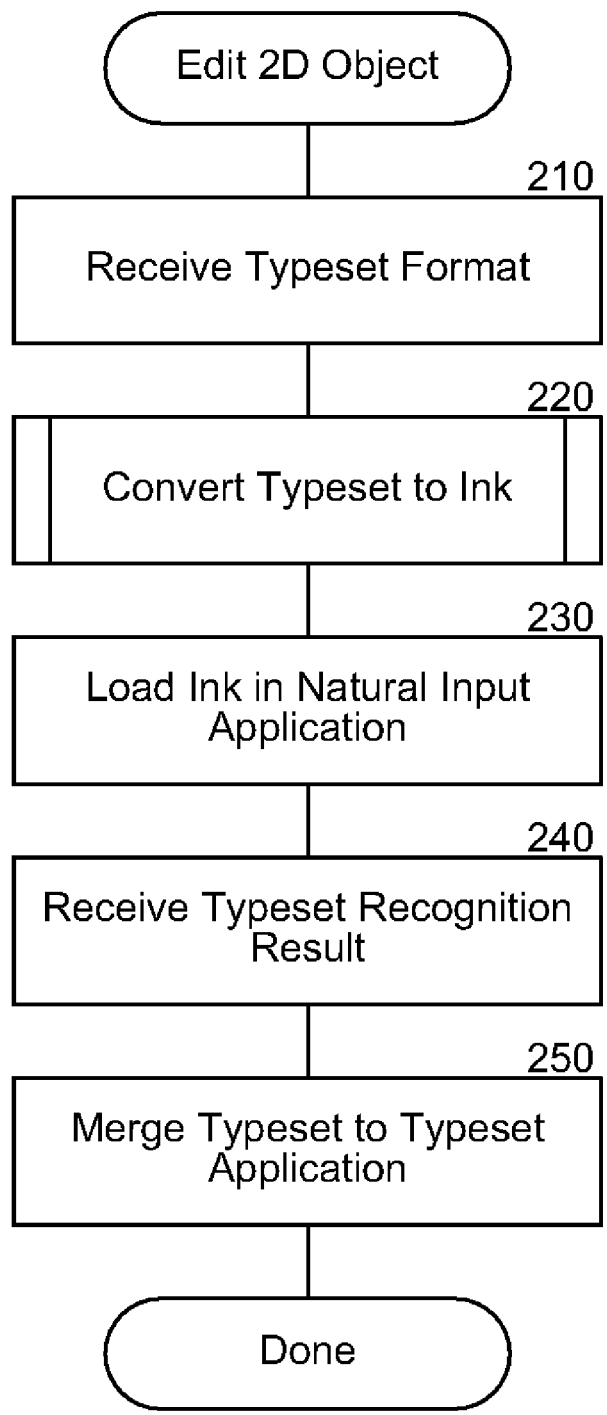
FIG. 2 is a flow diagram that illustrates the processing of the natural input system for editing a 2D object using natural input, in one embodiment.

FIG. 2 is a flow diagram that illustrates the processing of the natural input system for editing a 2D object using natural input, in one embodiment. Typically, the system is invoked when a user selects a 2D object in a typeset application that can be edited. In block 210, the system receives from the typeset application a typeset format representation of the 2D object. For example, the system may receive MathML representing a math equation from a word processing application like Microsoft Word 2007. In block 220, the system converts the 2D object from the typeset format representation to a digital ink representation of the 2D object. For example, the system may identify individual elements within the 2D object and identify an ink equivalent for each 2D element, as described further with reference to FIG. 3. In block 230, the system provides the converted digital ink representation of the 2D object to a natural input application that includes at least one recognizer for a specific 2D domain. For example, the system may provide the digital ink to a Math Input Panel (MIP), such as the one illustrated in FIG. 4. A user uses the natural input application to edit the 2D object, and may indicate when he/she is finished (e.g., by clicking a "Save" or "Done" button).

In block 240, the system receives a typeset recognition result of the 2D object. For example, the user may have added or removed elements from the 2D object using natural input such as handwriting gestures, and the natural input application may have recognized and converted the edited digital ink representation of the 2D object to a modified typeset format representation of the 2D object. For example, the natural input application may include a recognizer that recognizes digital ink and provides the result in a format that can be used by other applications. If needed, the system may perform a simple conversion between the output provided by the natural input application and a format expected by the typeset application. In block 250, the system provides the modified typeset format representation of the 2D object to the typeset application. For example, the system may replace the previous 2D object in a word processing document with the modified 2D object using an API of a word processing application. After block 250, these steps conclude.

Figure 3:
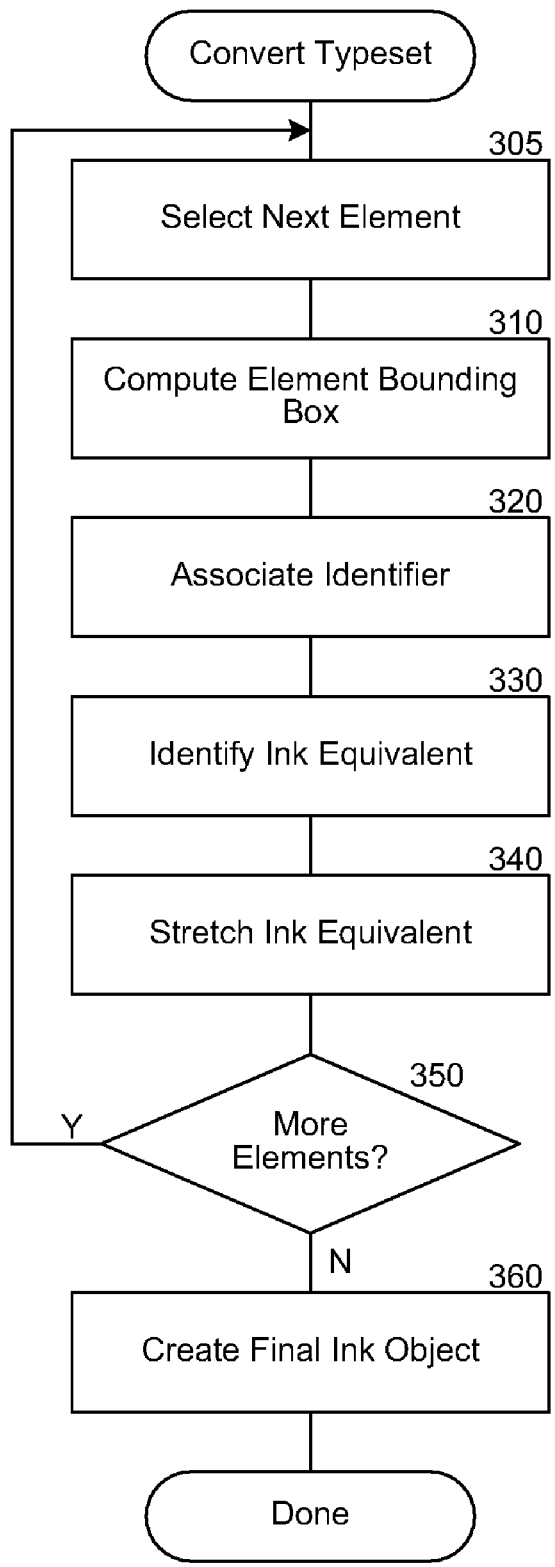
FIG. 3 is a flow diagram that illustrates the processing of the typeset to ink conversion component, in one embodiment.

FIG. 3 is a flow diagram that illustrates the processing of the typeset to ink conversion component, in one embodiment. The starting point of the conversion process is a typeset representation of a 2D structure. The initial size of the typeset representation of the 2D structure is not important; the described technique is size invariant. The 2D structure received from a typeset application is composed of elements.

For example, in the case of a math equation, the equation contains variables, exponents, symbols, and so forth. In block 305, the component selects the first or next element (in the case of subsequent rounds). In block 310, the natural input system computes a bounding box for the current element in the 2D structure. Those of ordinary skill in the art will recognize many ways of computing a bounding box for an element. In some embodiments, for the math domain the natural input system requests bounding boxes that are computed by a MathML renderer that is capable of identifying bounding boxes in rendering time. In block 320, the natural input system associates the computed bounding box with an identifier. For example, the identifier could be a Unicode character code (e.g., 0x0032 for the number two) for a math variable.

In block 330, the natural input system identifies an ink equivalent for the current element based on its associated identifier. The system provides or has access to an ink equivalent for each typeset element. For example, the system may store an ink object in a resource file for each supported typeset element. In one embodiment, the math domain has around 200 ink objects (i.e., all Latin and Greek characters, numbers, math operators, and so on) and can be easily stored in a resource file. In some embodiments, the natural input system only stores a single size for each ink element. Ink objects are typically vector objects, and thus do not lose quality when the system stretches them to accommodate different font sizes of typeset elements. Note that even though there is only one ink object per typeset element, inside the 2D structure one element can occur in several different sizes. For example, for a variable with an exponent, the exponent will typically be a smaller font than the variable, even if both have the same value (e.g., 2 raised to the 2nd power), but both can be represented with the same vector-based ink object.

In block 340, the natural input system stretches the identified ink equivalent to match the size of the typeset element based on the bounding box and places the ink equivalent in the correct position. For example, the system may stretch an ink "x" to match the size of a variable x from the typeset application and center the ink where the typeset element is centered. In this way, the system replaces each character present in typeset form (fraction line, root, x, y etc.) with an appropriate ink representation that respects relative spatial positions to other characters. In decision block 350, if there are more elements, then the system loops to block 310 to select the next typeset element, else the system continues to block 360.

In block 360, the natural input system collects the ink equivalents into a final ink object that has ink elements in the same relative spatial positions as the typeset ones. Because the size of the ink object can be proportionally changed without affecting the quality, the converting procedure is not dependant on the initial size of the typeset structure. The result is one ink object that is visually similar to the typeset representation of the 2D structure that the user can edit in a natural input application. After block 360, these steps conclude.

Figure 4:
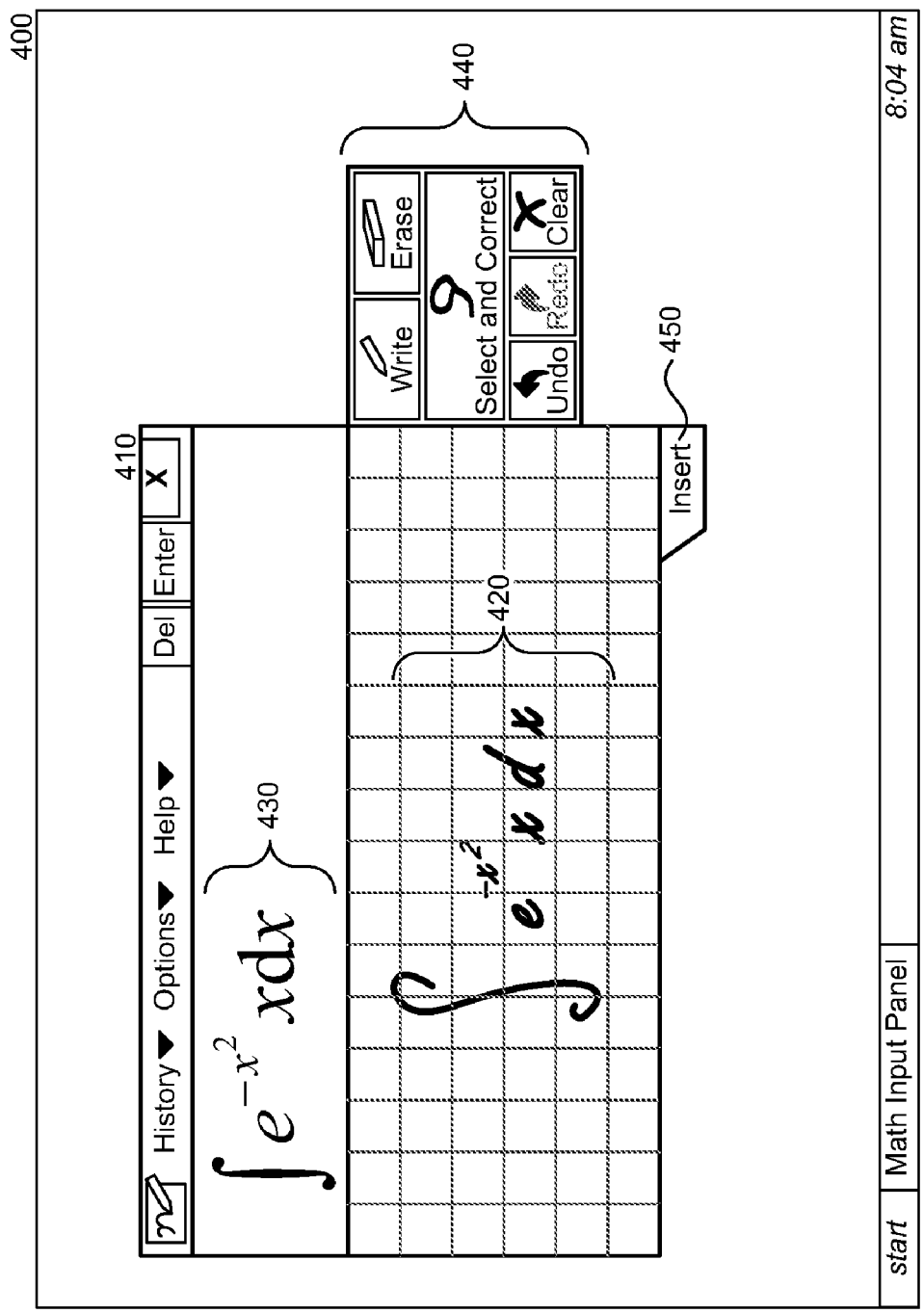
FIG. 4 is a display diagram that illustrates a standalone natural input application for use with the natural input system, in one embodiment.

FIG. 4 is a display diagram that illustrates a standalone natural input application for use with the natural input system, in one embodiment. The diagram includes a computer desktop 400 running a Math Input Panel application 410 for inserting math equations into applications using handwriting. The application 410 window includes a handwriting area 420, a recognition result area 430, one or more controls 440, and an insert button 450. The user draws mathematical symbols in the handwriting area 420 using a digital pen or other natural input device. The application 410 attempts to recognize the symbols as known symbols in the math domain, and displays the result in the recognition result area 430. The controls 440 allow the user to select specific portions of a math equation and correct the recognition result, as well as providing other common handwriting functions. For example, the application 410 may display a drop down list of several possible recognition results for a selected mathematical symbol, and the user can select the correct symbol from the list. Pressing the insert button 450 provides the recognition result back to the calling application. For example, pressing the insert button 450 may place the recognition result on the operating system clipboard where the calling application can receive it.

Figure 5:
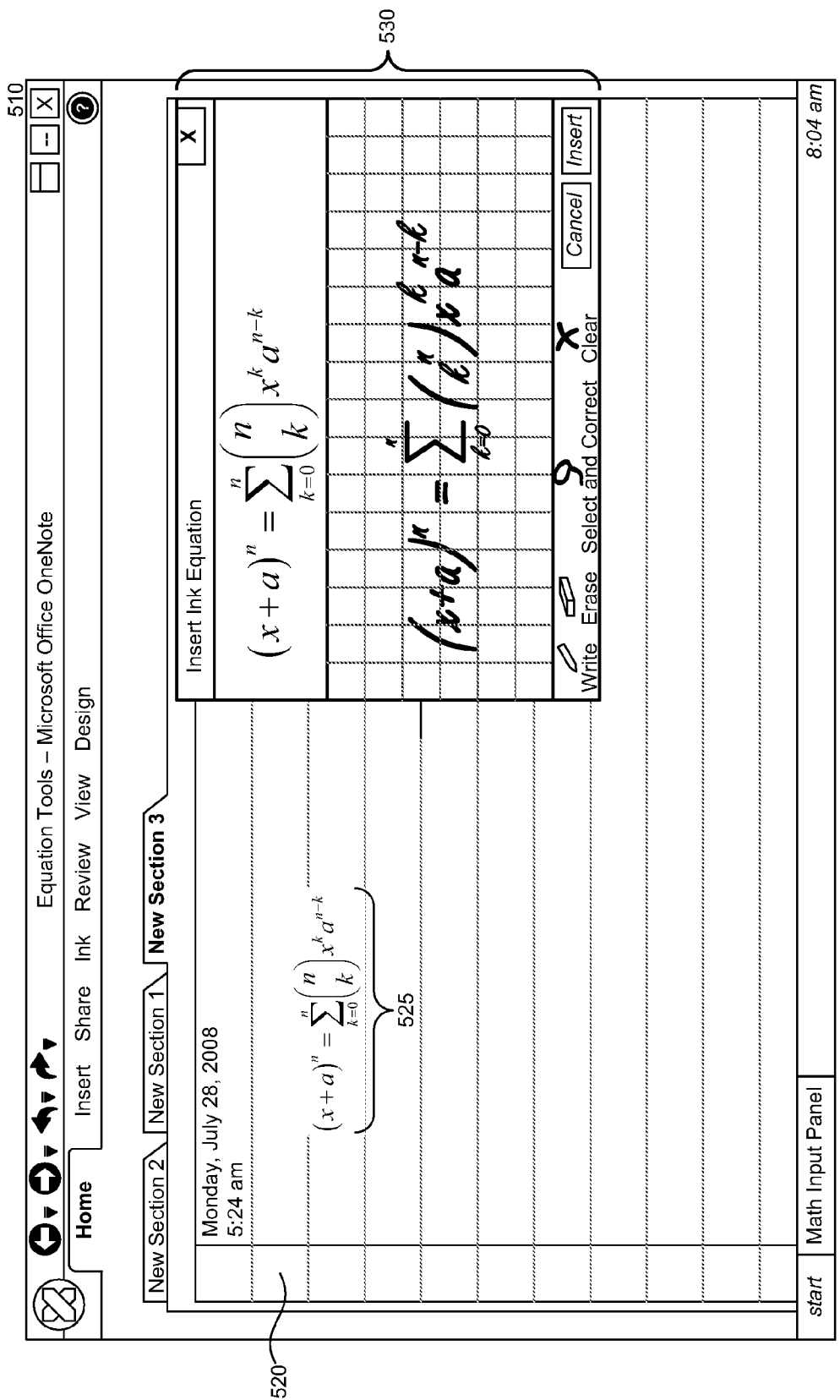
FIG. 5 is a display diagram that illustrates a natural input application in the form of a control launched inside of a word processing application, in one embodiment.

FIG. 5 is a display diagram that illustrates a natural input application in the form of a control launched inside of a word processing application, in one embodiment. The word processing application window 510 displays a document 520. The document 520 includes a 2D structure. For example, as illustrated the 2D structure can be a mathematical equation 525. The natural input system converts the equation 525 stored in the document 520 in a typeset representation to a digital ink representation and provides the digital ink representation to the natural input application as described herein. The natural input application illustrated is a control window 530 launched within the word processing application process. The control window 530 contains similar controls and functionality to that described with respect to FIG. 4. When the user finishes editing the equation 525 using natural input, the natural input system converts it back to a typeset representation and inserts the typeset representation into the document 520.

Figure 6:
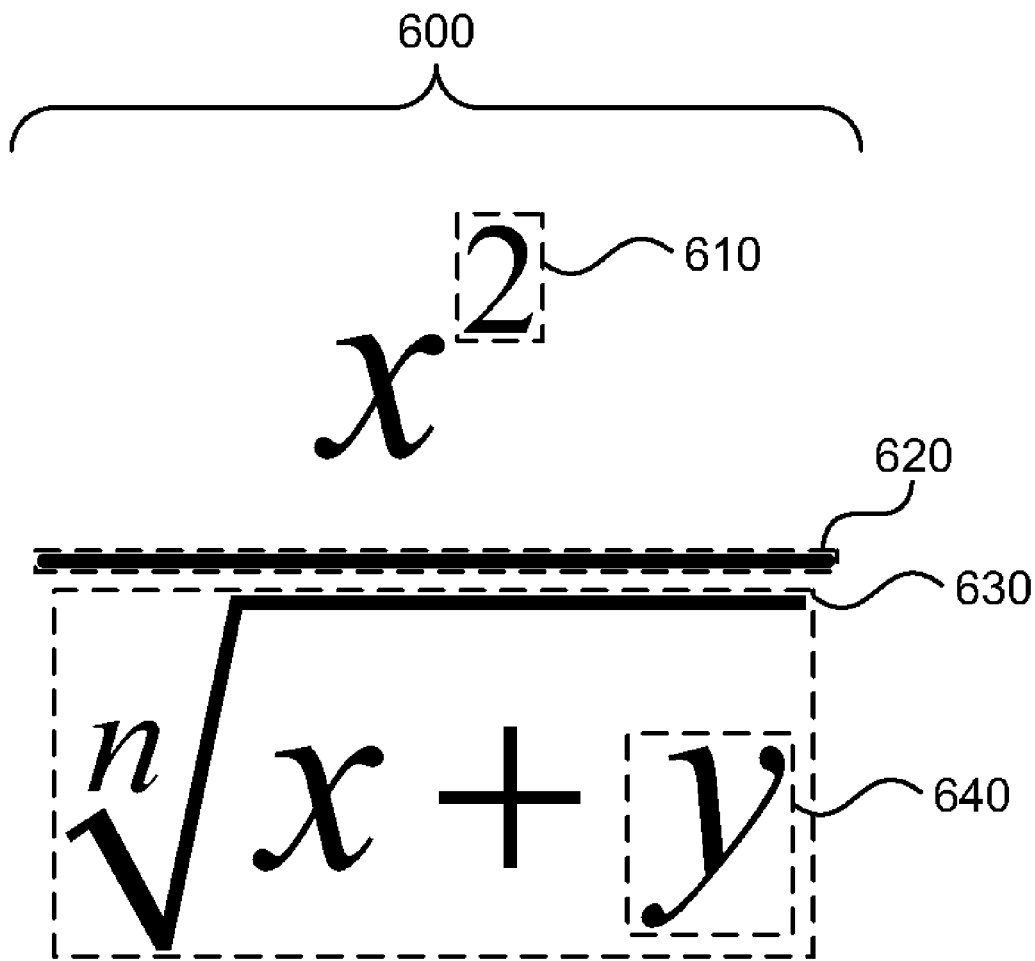
FIG. 6 is a display diagram that illustrates bounding boxes associated with a 2D structure, in one embodiment.

FIG. 6 is a display diagram that illustrates bounding boxes associated with a 2D structure, in one embodiment. The display diagram shows a mathematical equation 600 in a typeset representation form. As described herein, to convert the typeset representation to digital ink, the natural input system identifies elements within the typeset representation with bounding boxes and then finds a digital ink equivalent for each identified element. For the illustrated equation 600, the system identifies an exponent element 610, a fractional line element 620, a square root element 630, and a variable element 640. The system may also identify additional elements (e.g., the variable x in the figure in two locations) that are omitted for clarify of explanation. The bounding boxes determine a size for each element as well as the level of granularity over which the system will look for matching digital ink.

In some embodiments, the natural input system loads the converted typeset 2D structure into a control in the typeset application process. The natural input system loads a converted typeset 2D structure into a natural input application that is equipped with a natural input recognizer for a specific 2D domain (e.g., math, chemistry, music, and so forth). Natural input applications usually include a rich set of editing/correction features and tools that make editing much faster and more natural to than conventional input techniques, especially if end user is dealing with more complicated 2D structures. The conversion process from typeset 2D structure to ink object can take place before loading or after loading. The natural input application may be the same as the typeset application that hosts the typeset 2D structure. For example, the natural input application may run as a control (e.g., using ActiveX) that executes within the typeset application process, a separate accessory, or other type of application.

In some embodiments, the natural input system converts typeset into a standardized ink format that multiple applications can read. For a particular 2D structure, the user may have several natural input applications from which to choose. For example, the user may prefer one natural input application for editing mathematical equations and another application for editing musical notation. As another example, the user may prefer one natural input application for handwriting recognition and another for speech input. In this way, the natural input system can interoperate with many natural input applications and forms of input and provide the user with additional options.

From the foregoing, it will be appreciated that specific embodiments of the natural input system have been described herein for purposes of illustration, but that various modifications may be made without deviating from the spirit and scope of the invention. For example, although the system has been described in association with 2D structures, the methods described may also be applied to structures with three dimensions. Accordingly, the invention is not limited except as by the appended claims.

We claim

1. A computer-implemented method for editing 2D structures using a natural input method, the method comprising:
    receiving from a typeset application a typeset format representation of a 2D object;
    converting the 2D object from the typeset format representation to a digital ink representation of the 2D object;
    providing the converted digital ink representation of the 2D object to a natural input application, wherein the natural input application includes at least one recognizer for a specific 2D domain;
    receiving modified typeset format representation of the 2D object from the recognizer of the natural input application; and
    providing the modified typeset format representation of the 2D object to the typeset application.

2. The method of claim 1 wherein the 2D object is a mathematical equation and the typeset format representation is MathML.

3. The method of claim 1 wherein converting the 2D object from the typeset format representation to a digital ink representation comprises identifying elements of the 2D object and determining a digital ink equivalent for each identified element.

4. The method of claim 1 wherein providing the converted digital ink comprises invoking an API of the natural input application for loading typeset or digital ink into the natural input application.

5. The method of claim 1 wherein providing the modified typeset format representation comprises invoking an API of the typeset application for inserting typeset objects into the typeset application.

6. The method of claim 1 wherein receiving a modified typeset format representation comprises invoking a domain-specific handwriting recognizer.

7. The method of claim 1 wherein the typeset application is a word processing application for editing documents that include 2D objects.

8. The method of claim 1 wherein a domain of the 2D object is selected from the group consisting of mathematical expressions, chemical expressions, and music notations.

9. A computer system for editing a two-dimensional structure stored in a typeset application using handwriting, the system comprising:
    a processor and memory configured to execute software instructions embodied within the following components;
    a typeset export component configured to export a 2D structure from the typeset application;
    a typeset-to-ink converter component configured to receive the exported 2D structure and convert the exported 2D structure to a digital ink representation;
    an ink load component configured to load the digital ink representation of the 2D structure into a natural input application in which a user can edit the 2D structure using handwriting;
    an ink recognizer component configured to recognize the modified digital ink and convert the recognized digital ink into a modified typeset structure; and
    a typeset merge component configured to receive the modified 2D typeset structure and provide the structure to the typeset application.

10. The system of claim 9 wherein the typeset-to-ink converter component is further configured to divide the received typeset into one or more symbols and identify an ink equivalent for each symbol.

11. The system of claim 10 wherein after identifying the ink equivalent for each symbol, the typeset-to-ink converter component combines information about the identified ink equivalents in an ink representation structure that contains information about the layout and size of each ink element.

12. The system of claim 9 wherein the typeset-to-ink converter component is further configured to store ink equivalents of typeset characters as vector objects independent of size.

13. A computer-readable storage device comprising instructions for controlling a computer system to edit 2D structures using a natural input method, wherein the instructions, upon execution, cause a processor to perform actions comprising:
    receiving from a typeset application a typeset format representation of a 2D object;
    converting the 2D object from the typeset format representation to a digital ink representation of the 2D object;
    providing the converted digital ink representation of the 2D object to a natural input application, wherein the natural input application includes at least one recognizer for a specific 2D domain;
    receiving modified typeset format representation of the 2D object from the recognizer of the natural input application; and
    providing the modified typeset format representation of the 2D object to the typeset application.

14. The device of claim 13 wherein the 2D object is a mathematical equation and the typeset format representation is MathML.

15. The device of claim 13 wherein converting the 2D object from the typeset format representation to a digital ink representation comprises identifying elements of the 2D object and determining a digital ink equivalent for each identified element.

16. The device of claim 13 wherein providing the converted digital ink comprises invoking an API of the natural input application for loading typeset or digital ink into the natural input application.

17. The device of claim 13 wherein providing the modified typeset format representation comprises invoking an API of the typeset application for inserting typeset objects into the typeset application.

18. The device of claim 13 wherein receiving a modified typeset format representation comprises invoking a domain-specific handwriting recognizer.

19. The device of claim 13 wherein the typeset application is a word processing application for editing documents that include 2D objects.

20. The device of claim 13 wherein a domain of the 2D object is selected from the group consisting of mathematical expressions, chemical expressions, and music notations.

* * * * *